(12) United States Patent
Ito (10) Patent No.: US 7,756,088 B2
(45) Date of Patent: Jul. 13, 2010

(54) RADIO BASE STATION SYSTEM, CHANNEL ALLOCATION METHOD AND CHANNEL ALLOCATION PROGRAM

(75) Inventor: Tadayoshi Ito, Moriguchi (JP)

(73) Assignee: Kyocera Corporation, Kyoto (JP)

( * ) Notice: Subject to any disclaimer, the term of this patent is extended or adjusted under 35 U.S.C. 154(b) by 831 days.

(21) Appl. No.: 10/536,836

(22) PCT Filed: Feb. 20, 2004

(86) PCT No.: PCT/JP2004/002040

§ 371 (c)(1),
(2), (4) Date: May 31, 2005

(87) PCT Pub. No.: WO2004/086802

PCT Pub. Date: Oct. 7, 2004

(65) Prior Publication Data

US 2006/0068819 A1 Mar. 30, 2006

(30) Foreign Application Priority Data

Mar. 27, 2003 (JP) ............................. 2003-087897

(51) Int. Cl.
*H04J 3/00* (2006.01)
(52) U.S. Cl. ..................... 370/337; 370/443; 370/503
(58) Field of Classification Search ............... 455/502, 455/450, 524; 370/465, 328, 338, 337, 443, 370/503

See application file for complete search history.

(56) References Cited

U.S. PATENT DOCUMENTS 6,119,015 A * 9/2000 Eun ........................... 455/502
6,847,826 B1 * 1/2005 Wesby et al. ................ 455/502
2005/0111484 A1 * 5/2005 Obata ......................... 370/465
2005/0243745 A1 * 11/2005 Stanwood et al. ........... 370/280

FOREIGN PATENT DOCUMENTS

| JP | 05-191858 |   | 7/1993 |
|----|-----------|---|--------|
| JP | 09-327066 | A | 12/1997 |
| JP | 10-304437 |   | 11/1998 |
| JP | 2000-253460 | * | 3/1999 |
| JP | 11-196459 | A | 7/1999 |
| JP | 11-205849 | * | 7/1999 |
| JP | 11-252639 | A | 9/1999 |
| JP | 11-355837 |   | 12/1999 |
| JP | 2000-102056 | A | 4/2000 |
| JP | 2000-253460 |   | 9/2000 |
| JP | 2001-268630 | A | 9/2001 |
| JP | 2003-392529 | * | 11/2003 |

* cited by examiner

*Primary Examiner*—Ajit Patel
*Assistant Examiner*—Khai M Nguyen
(74) *Attorney, Agent, or Firm*—Foley & Lardner, LLP (57) ABSTRACT

A frame synchronizing unit of a slave base station synchronizes its own frame with a frame of the master base station, reception control slot setting control unit sets, as a reception control slot, a predetermined reception slot in its own frame matching in timing with a reception control slot in the frame of the master base station. A reception level obtaining unit of each of the base stations obtains a reception level of the reception control slot thus set when a link channel establishment request message is received in the set reception control slot. A traffic channel allocation control unit allocates a traffic channel with respect to a mobile station transmitting the link channel establishment request message to predetermined transmission and reception slots in the frame according to a traffic channel allocation instruction.

8 Claims, 7 Drawing Sheets

MESSAGE TYPE = LINK ALLOCATION REJECTION

MESSAGE TYPE = TRAFFIC CHANNEL SWITCH INSTRUCTION

RADIO BASE STATION SYSTEM, CHANNEL ALLOCATION METHOD AND CHANNEL ALLOCATION PROGRAM

This application is a National Stage application of PCT/JP2004/002040, filed Feb. 20, 2004, which claims priority from Japanese patent application JP 2003-087897, filed Mar. 27, 2003. The entire contents of each of the aforementioned applications are incorporated herein by reference.

TECHNICAL FIELD

The present invention relates to a radio base station system, a channel allocation method of the radio base station system and a channel allocation program of the radio base station system, and particularly relates to a radio base station system, which is formed of one master base station as well as a plurality of slave base stations connected to the master base station via cables, a channel allocation method of the radio base station system and a channel allocation program of the radio base station system.

BACKGROUND ART

Radio base stations, e.g., of the PHS (Personal Handyphone System) perform communications in a TDMA/TDD (Time Division Multiple Access/Time Division Duplex) method. In the TDMA/TDD method, one frame is formed of four pairs of slots of up and down links. Usually, a control channel is allocated to one of the four slot pairs, and traffic channels are allocated to the three slot pairs. Assuming that "C" represents the control channel, and "T" represents the traffic channel, the frame of the radio base station usually has a frame structure of 1C3T.

Japanese Patent Laying-Open No. 2000-102056 has disclosed a radio base station system formed of a master base station and slave base stations. The frame of the master base station has a usual structure of 1C3T, and the control channel of the master base station is shared by the master and slave base stations. In the slave base station, therefore, traffic channels are allocated to all the four slot pairs. Thus, the frame of the slave base station usually has a structure of 4T. Therefore, the radio base station system has a frame structure of 1C7T as a whole.

In the foregoing radio base station system formed of the master base station and slave base stations, it is not necessary to allocate the control channel to the frame of the slave base station so that it is possible to increase the number the traffic channels, which can be allocated.

When a mobile station makes a call to the radio base station system, the master base station receives a link channel establishment request message from the mobile station, and allocates the traffic channel to the frame of the master or slave base station.

When the traffic channel is allocated to the frame of the master base station, the base station receiving the link channel establishment request is the same as the base station, to which the traffic channel is allocated, so that no problem occurs.

However, when the traffic channel is allocated to the frame of the slave base station, the base station receiving the link channel establishment request is different from the base station, to which the traffic channel is allocated. This causes the following problem.

Even when situations of radio waves of the master base station are suitable for communications with the mobile station, and the master base station can receive the link channel establishment request, such a case may occur that situations of the radio waves of the slave base station are not suitable for the communications with this mobile station, and the exchange of messages and others cannot be performed appropriately between the mobile station and the slave base station. In this case, calling from the mobile station fails.

Accordingly, an object of the invention is to provide a radio base station formed of a master base station and a plurality of slave base stations, and particularly to provide a radio base station system, to which a mobile station can make a call more successfully, as well as a channel allocation method of the radio base station system and a channel allocation program of the radio base station system.

DISCLOSURE OF THE INVENTION

For achieving the above object, a radio base station system according to the invention is formed of one master base station, a plurality of slave base stations, and a control device controlling the master base station and the slave base stations. The slave base station includes frame synchronizing means for synchronizing a frame of the slave base station with a frame of the master base station, and slot setting means for setting, as a reception control slot, a predetermined reception slot in the frame of the slave base station matching in timing with a reception control slot in the frame of the master base station. Each of the base stations includes reception level obtaining means for obtaining a reception level of the set reception control slot when a link channel establishment request message is received in the set reception control slot, and traffic channel allocating means for allocating a traffic channel with respect to a mobile station transmitting the link channel establishment request message to predetermined transmission and reception slots in the frame according to a traffic channel allocation instruction. The control device includes allocation instructing means for receiving the reception level from each of the base stations, determining the base station of the maximum reception level and transmitting the traffic channel allocation instruction to the determined base station.

Preferably, the traffic channel allocation means of the slave base station allocates the traffic channel to the reception slot satisfying predetermined conditions when the reception slot satisfying the predetermined conditions exists other than the predetermined reception slot, and allocates the traffic channel to the predetermined reception slot when the reception slot satisfying the predetermined conditions does not exist.

Preferably, the slave base station further includes traffic channel switching means for switching the slot for allocation of the traffic channel to the reception slot satisfying the predetermined conditions when the reception slot satisfying the predetermined conditions occurs among the reception slots other than the predetermined reception slot after the traffic channel is allocated to the predetermined reception channel.

A channel allocation method according to the invention is a channel allocation method in a radio base station system formed of one master base station, a plurality of slave base stations and a control device controlling the master base station and the slave base stations, and includes the steps of causing the slave base station to synchronize a frame of the same slave base station with a frame of the master base station; causing the slave base station to set a predetermined reception slot in the frame of the same slave base station matching in timing with the reception control slot in the frame of the master base station as the reception control slot; causing each of the base stations to obtain a reception level of the set reception control slot when the base station receives a link channel establishment request message in the set reception control slot; causing the control device to receive the reception level from each of the base stations, determine the base station of the maximum reception level and transmit a traffic channel allocation instruction to the determined base station; and causing the base station receiving the traffic channel allocation instruction to allocate a traffic channel with respect to a mobile station transmitting the link channel establishment request message to the predetermined transmission and reception slots in the frame.

Preferably, the step of allocating the traffic channel of the slave base station is executed to allocate the traffic channel to the reception slot satisfying predetermined conditions when the reception slot satisfying the predetermined conditions exists other than the predetermined reception slot, and to allocate the traffic channel to the predetermined reception slot when the reception slot satisfying the predetermined conditions does not exist.

Preferably, the channel allocation method further includes the step of switching the slot for allocation of the traffic channel to the reception slot satisfying the predetermined conditions when the reception slot satisfying the predetermined conditions occurs among the reception slots other than the predetermined reception slot after the traffic channel is allocated to the predetermined reception channel.

A channel allocation program according to the invention is a channel allocation program in a radio base station system formed of one master base station, a plurality of slave base stations and a control device controlling the master base station and the slave base stations, and causes a computer to execute the steps of causing the slave base station to synchronize a frame of the same slave base station with a frame of the master base station; causing the slave base station to set a predetermined reception slot in the frame of the same slave base station matching in timing with the reception control slot in the frame of the master base station as the reception control slot; causing each of the base stations to obtain a reception level of the set reception control slot when the base station receives a link channel establishment request message in the set reception control slot; causing the control device to receive the reception level from each of the base stations, determine the base station of the maximum reception level and transmit a traffic channel allocation instruction to the determined base station; and causing the base station receiving the traffic channel allocation instruction to allocate a traffic channel with respect to a mobile station transmitting the link channel establishment request message to the predetermined transmission and reception slots in the frame.

Preferably, the step of allocating the traffic channel of the slave base station is executed to allocate the traffic channel to the reception slot satisfying predetermined conditions when the reception slot satisfying the predetermined conditions exists other than the predetermined reception slot, and to allocate the traffic channel to the predetermined reception slot when the reception slot satisfying the predetermined conditions does not exist.

Preferably, the channel allocation program further causes the computer to execute the step of switching the slot for allocation of the traffic channel to the reception slot satisfying the predetermined conditions when the reception slot satisfying the predetermined conditions occurs among the reception slots other than the predetermined reception slot after the traffic channel is allocated to the predetermined reception channel.

Accordingly, the radio base station system, the channel allocation method and channel allocation program according to the invention allow calling from the mobile station more successfully.

BEST MODES FOR CARRYING OUT THE INVENTION

Embodiments of the invention will now be described with reference to the drawings. Terms and processing procedures used in the following embodiments are basically based on "2nd-Generation Cordless Telephone System Standard Specification" RCR STD-28.

Figure 1:
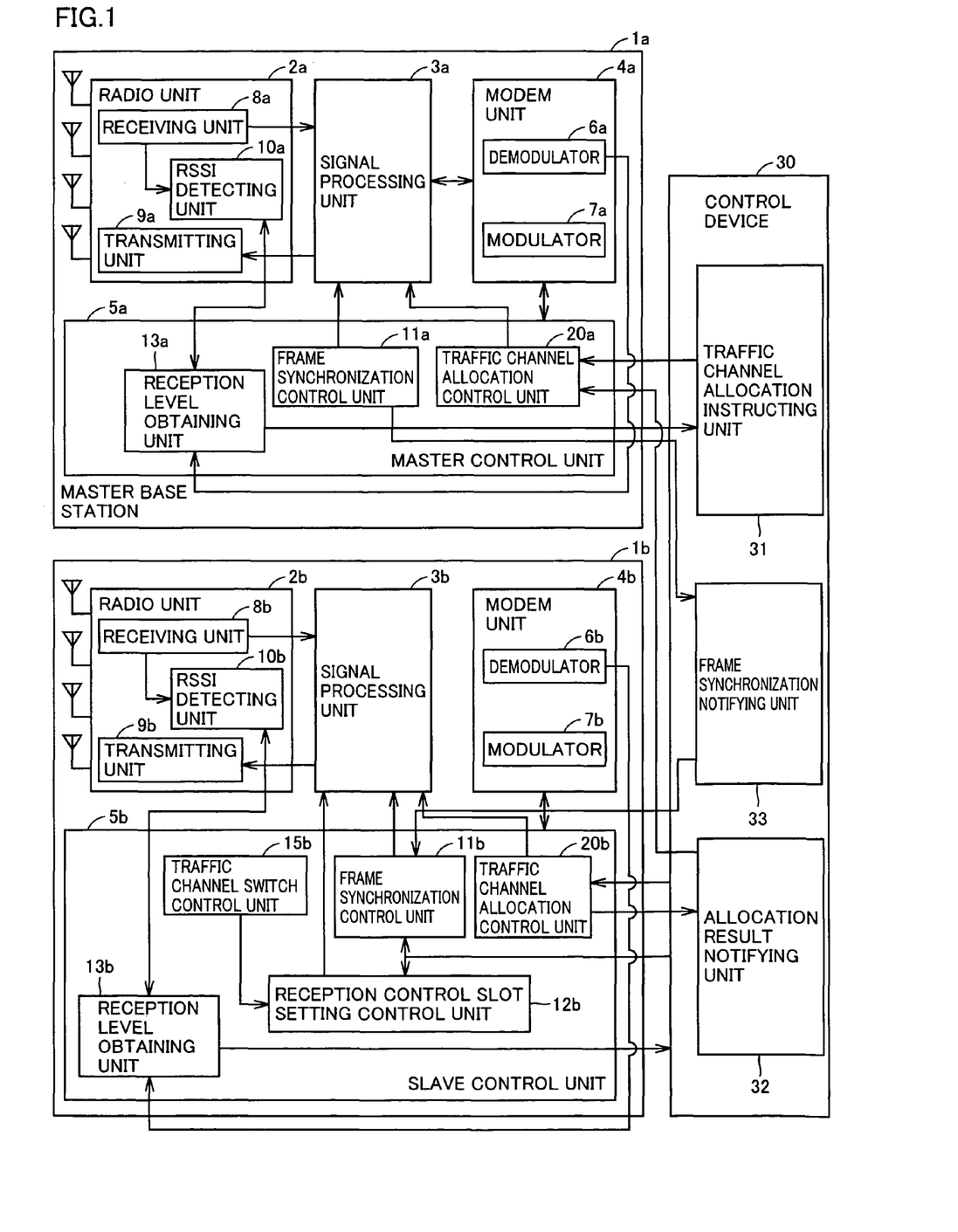
FIG. 1 is a function block diagram illustrating a structure of a radio base station system according to an embodiment of the invention.

FIG. 1 is a function block diagram illustrating a structure of a radio base station system according to an embodiment of the invention. Referring to FIG. 1, the radio base station system includes a master base station 1a, a slave base station 1b and a control device 30. Master base station 1a and control device 30 are connected together by a cable, and slave base station 1b and control device 30 are also connected together by a cable.

Master base station 1a includes a radio unit 2a, a signal processing unit 3a, a modem unit 4a and a master control unit 5a. Slave base station 1b includes a radio unit 2b, a signal processing unit 3b, a modem unit 4b and a slave control unit 5b.

Radio unit 2a includes a receiving unit 8a, a transmitting unit 9a and an RSSI detecting unit 10a.

Receiving unit 8a performs down-conversion on a radio-frequency signal (RF signal) received from an antenna, which is selected by selection diversity reception, to produce a signal (IF signal) of an intermediate frequency, and amplifies its level to a predetermined voltage level.

Transmitting unit 9a performs up-conversion on the signal (IF signal) of the intermediate frequency to provide a radio-frequency signal (RF signal), amplifies its level to a predetermined voltage level, and provides the signal thus prepared to the antenna selected by selection diversity transmission.

RSSI (Received Signal Strength Indicator) detecting unit 10a detects a reception level of the received RF signal, and provides a result of the detection to master control unit 5a.

Modem unit 4a includes a modulator 7a and a demodulator 6a. Modulator 7a performs modulation in a π/4 shift QPSK method on the transmission signal, and provides the modulated signal to a signal processing unit 6. Demodulator 6a performs demodulation in the π/4 shift QPSK method on the reception signal processed by signal processing unit 6, and provides the demodulated information to master control unit 5a.

Signal processing unit 3a executes signal processing such as synchronization processing, time-division processing, scramble and descramble according to the standards of the PHS.

Figure 2:
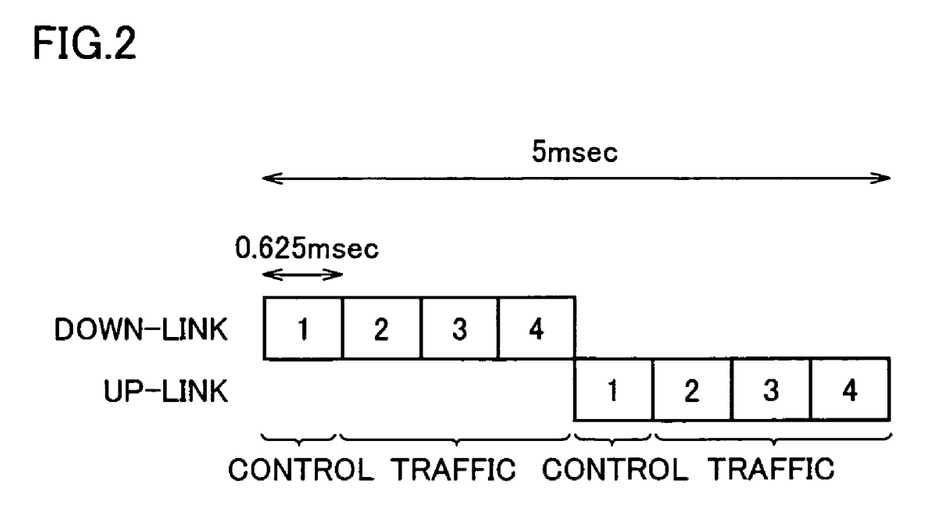
FIG. 2 illustrates a structure of a frame of a TDMA/TDD method.

Signal processing unit 3a performs the time-division processing according to the TDMA/TDD (Time Division Multiple Access/Time Division Duplex) method. FIG. 2 illustrates a frame of the TDMA/TDD method. According to the TDMA/TDD method, as illustrated in FIG. 2, one frame is formed of four pairs of slots for up link (from radio base station to mobile terminal device) and down link (from mobile terminal device to radio base station). Each slot has a length of 625 microseconds and 240 bits, and one frame has a length of 5 milliseconds and 8 slots. When viewed from the base station side, the four slots of the down link are slots for transmission, and the four slots of the up link are slots for reception.

To the four pairs of slots, a control channel (which may also be referred to as a "CCH" hereinafter) or a traffic channel (which may also be referred to as a "TCH" hereinafter) is allocated. The slot, to which the CCH is allocated, is referred to as a control slot, and the slot, to which the TCH is allocated, is referred to as a traffic slot. The CCH information is transmitted through the CCH, and the TCH information is transmitted through the TCH. The CCH information is used for activating and establishing the TCH.

The frequencies of these slots may not be equal to each other. A frequency dedicated to the control is used for the control slot, and a frequency for the traffic slot is selected from frequencies, which are not used, among many frequencies for communications.

Radio unit 2b, signal processing unit 3b and modem unit 4b in slave base station 1b perform the same processing as radio unit 2a, signal processing unit 3a and modem unit 4a in master base station 1a, respectively, so that description of these components is not repeated.

Referring to FIG. 1 again, master control unit 5a includes a reception level obtaining unit 13a, a frame synchronization control unit 11a and a traffic channel allocation control unit 20a. Slave control unit 5b includes a reception level obtaining unit 13b, a frame synchronization control unit 11b, a traffic channel allocation control unit 20b, a reception control slot setting control unit 12b and a traffic channel switch control unit 15b.

Frame synchronization control unit 11a in master control unit 5a controls signal processing unit 3a to perform frame synchronization with respect to another base station. Each base station transmits the CCH information in a cycle of 100 milliseconds by using down-link slot 1 for transmission illustrated in FIG. 2. If the timing, according to which this CCH information is transmitted from each base station, overlaps with that of another base station, the CCH information transmitted from one base station may interfere with that of another base station so that the base station may not correctly obtain the CCH information. Accordingly, each base station performs the frame synchronization with respect to other base stations in a predetermined cycle (e.g., at a predetermined time on a daily basis). After performing the frame synchronization with respect to the other base stations, frame synchronization control unit 11a transmits the timing of the frame in its own station to a frame synchronization notifying unit 33 in control device 30.

Figure 3:
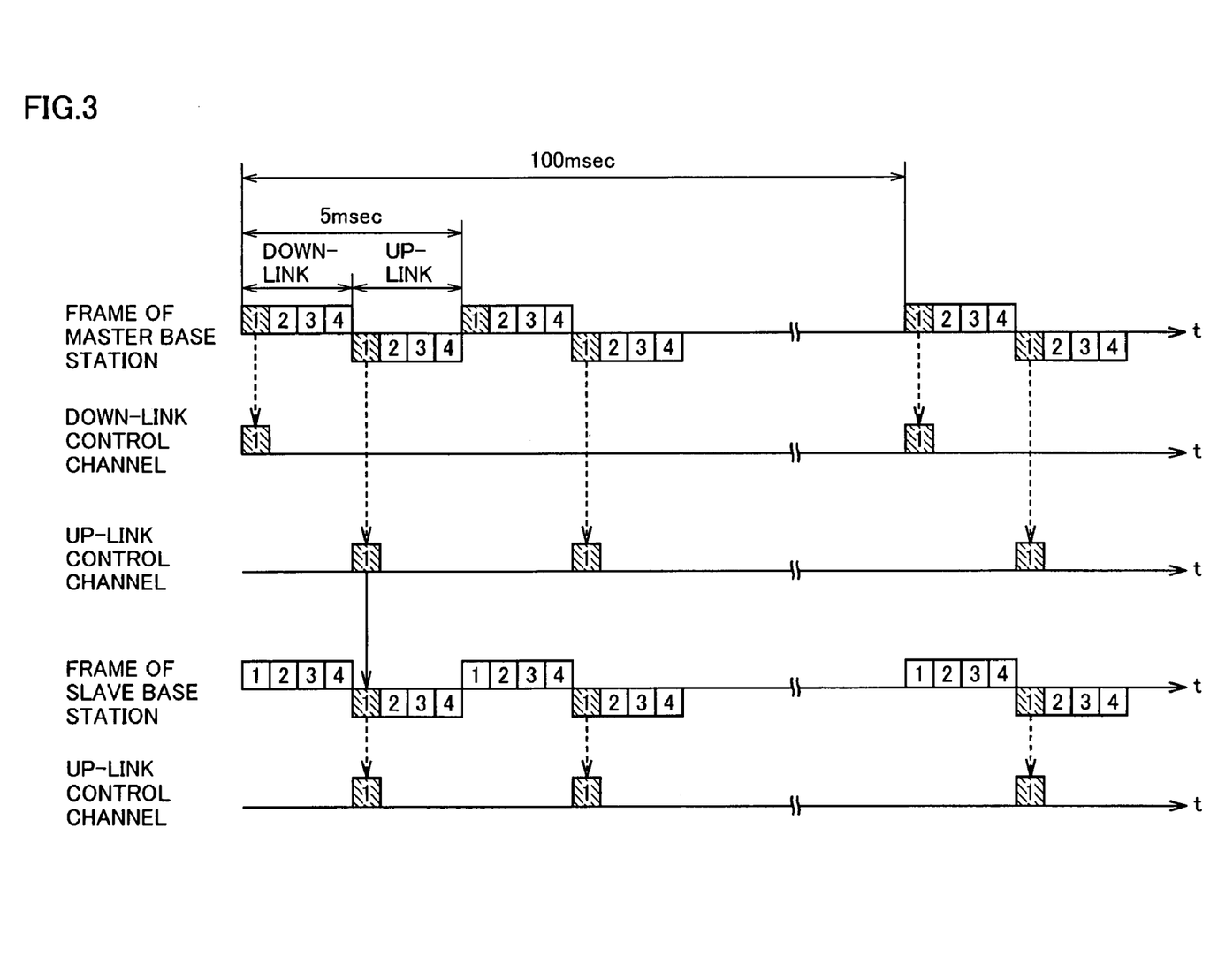
FIG. 3 illustrates structures of frames of a master base station and a slave base station.

FIG. 3 illustrates a structure of frames of the master base station and the slave base station in a link channel establishment phrase. As shown in FIG. 3, master base station 1a transmits the CCH information at intervals of 100 milliseconds (i.e., 20 frames), and receives the CCH information at intervals of 5 milliseconds (i.e., one frame).

When frame synchronization control unit 11b in slave base station 1b receives timing of the frame of master base station 1a from frame synchronization notifying unit 33 in control device 30, it controls signal processing unit 3b to match the timing of the frame in its own station with the timing of the frame of master base station 1a. When frame synchronization control unit 11b establishes the frame synchronization with the frame timing of another base station, it notifies reception control slot setting control unit 12b to that effect.

When reception control slot setting control unit 12b in slave base station 1b is notified by frame synchronization control unit 11b of the fact the frame synchronization is established, or is notified by traffic channel switch control unit 15 of the fact the traffic channel is switched, reception control slot setting control unit 12b controls signal processing unit 3b to set a first reception slot (i.e., first slot for reception), which is the slot of the same timing as a reception control slot (i.e., control slot for reception) of master base station 1a, as the reception control slot as illustrated in FIG. 3. In contrast to master base station 1a, slave base station 1b is configured not to set a control slot in a transmission slot (i.e., slot for transmission).

Reception level obtaining unit 13a in master base station 1a and reception level obtaining unit 13b in slave base station 1b perform the same processing. Thus, reception level obtaining units 13a and 13b obtain demodulated data of signals, which are provided from demodulators 6a and 6b, and are received in the first reception slots, and determine whether the received data are link channel establishment request messages or not.

Figure 4:
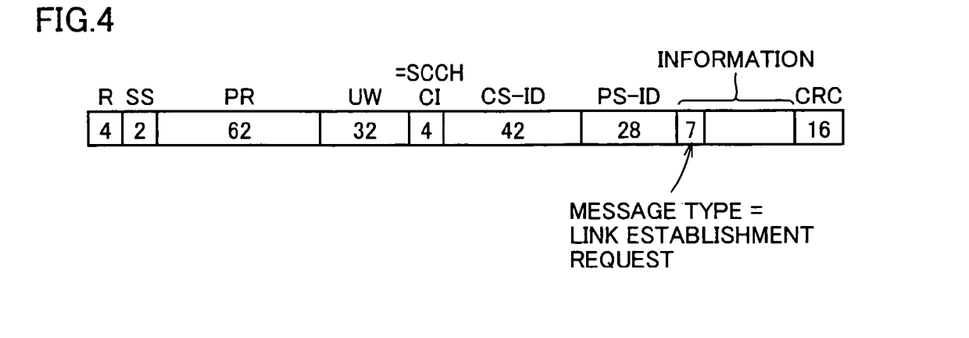
FIG. 4 illustrates a data format of a link channel establishment request message.

FIG. 4 illustrates a data format of the link channel establishment request message. Referring to FIG. 4, the link channel establishment request message is formed of a transient response ramp amplifier (R), a start symbol (SS), a preamble (PR), a unique word (UW), a channel control (CI), a base station identification code (CS-ID), a mobile station identification code (PS-ID), information bits and error check bits (CRC).

Transient response ramp amplifier (R) is a signal for smoothing transient states of rising and falling of the transmission signal. Start symbol (SS) is a signal for indicating start of the transmission signal. Preamble (PR) is a signal for producing the clock signal from the reception signal, and thereby establishing the bit synchronization between the base and mobile stations. Unique word (UW) is a signal for establishing the word synchronization. Channel control (CI) represents that this slot is used as a separate cell channel (SCCH), i.e., a channel for separate cell. Base station identification code (CS-ID) is a code allocated to each base station. Mobile station identification code (PS-ID) is a code allocated to each mobile station. Message type included in the information bits represents that this message is the link establishment request message. Error check bits (CRC) are bits for detecting an error by a generating polynomial.

When each of reception level obtaining units 13a and 13b obtains the link channel establishment request message, it causes corresponding RS SI detecting unit 10a or 10b to detect the reception level of the reception signal in this reception slot in and after the next cycle, and transmits the reception level thus obtained to a traffic channel allocation instructing unit 31 in control device 30.

When traffic channel allocation control unit 20a in master base station 1a receives an instruction for the traffic channel allocation from traffic channel allocation instructing unit 31 in control device 30, traffic channel allocation control unit 20a measures an interference level of the second, third and fourth reception slots in the frame.

When the minimum value of the interference levels of the second to fourth reception slots thus measured is equal to or smaller than a predetermined threshold, traffic channel allocation control unit 20a controls signal processing unit 3a to allocate the traffic channel to the slot (reception slot) of the minimum interference level and the transmission slot paired with it.

Figure 5A:
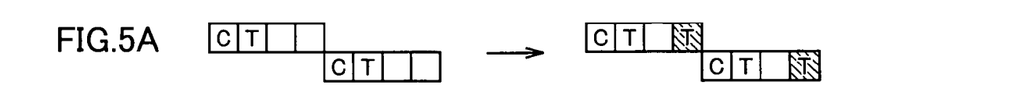
FIG. 5A illustrates an example of traffic channel allocation to a frame of a master base station.

FIG. 5A illustrates an example of the traffic channel allocation to the frame of the master base station. As illustrated in FIG. 5A, the traffic channel is allocated to the fourth slot in the frame of master base station 1a.

When the minimum value of the interference levels of the second to fourth reception slots is larger than the predetermined threshold, traffic channel allocation control unit 20a determines that the allocation is impossible.

When traffic channel allocation control unit 20b in slave base station 1b receives the instruction for the traffic channel allocation from traffic channel allocation instructing unit 31 in control device 30, traffic channel allocation control unit 20b measures the interference levels of the second to fourth reception slots in the frame.

When the minimum value of the measured interference levels of the second to fourth reception slots are equal to or smaller than the predetermined threshold, the traffic channel allocation control unit 20b controls signal processing unit 3b, and allocates the traffic channel to the slot (reception slot) of the minimum interference level and the transmission slot paired with it.

Figure 5B:
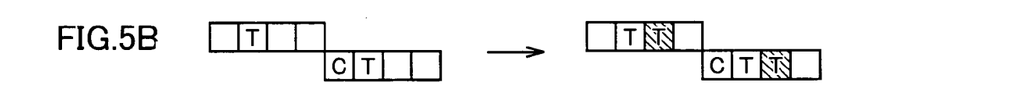
FIG. 5B illustrates an example of the traffic channel allocation to a frame of a slave base station.

FIG. 5B shows an example of the traffic channel allocation to the frame of the slave base station. As illustrated in FIG. 5B, the traffic channel is allocated to the second slot in the frame of slave base station 1b.

When the minimum value of the measured interference levels of the second to fourth reception slots is larger than the predetermined threshold, the traffic channel allocation control unit 20b measures the interference level of the first reception slot.

When the measured interference level of the first reception slot is equal to or smaller than a predetermined threshold, the traffic channel allocation control unit 20b controls signal processing unit 3b to allocate the traffic channel to the first slots (the reception slot and the transmission slot).

Figure 5C:
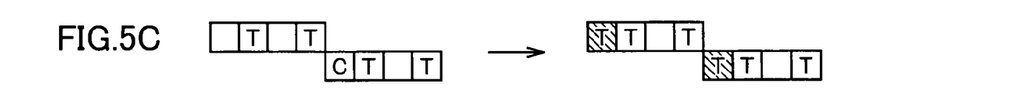
FIG. 5C illustrates another example of the traffic channel allocation to the frame of the slave base station.

FIG. 5C illustrates another example of the traffic channel allocation to the frame of the slave base station. As illustrated in FIG. 5C, the traffic channel is allocated to the first slot in the frame of slave base station 1b. Thereby, the reception control slot disappears in the frame of slave base station 1b.

When the measured interference level of the first reception slot is larger than the predetermined threshold, the traffic channel allocation control unit 20b determines that the allocation is impossible.

When the traffic channel is allocated, traffic channel allocation control unit 20b notifies an allocation result notifying unit 32 in control device 30 to the effect that the traffic channel is allocated, and also notifies of the allocated slot number.

When traffic channel allocation control unit 20b determines that the allocation of the traffic channel is impossible, it notifies allocation result notifying unit 32 in control device 30 of the result of determination that the allocation of the traffic channel is impossible.

When traffic channel allocation control unit 20a allocates the traffic channel in its own station, and when it receives the notification from allocation result notifying unit 32 in control device 30 to the effect that the traffic channel is allocated in slave base station 1b as well as the notification of the slot number, traffic channel allocation control unit 20a controls signal processing units 3a and 3b to transmit the link channel allocation message.

Figure 6:
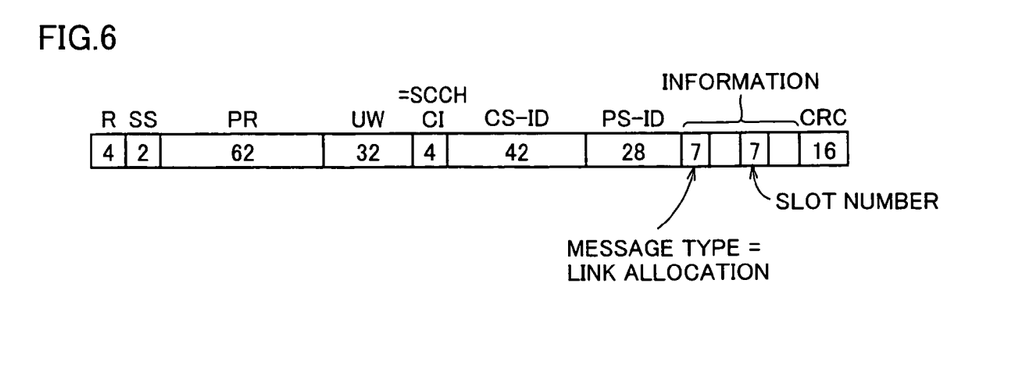
FIG. 6 illustrates a data format of a link channel allocation message.

FIG. 6 illustrates a data format of the link channel allocation message. Referring to FIG. 6, the link channel allocation message is formed of a transient response ramp amplifier (R), a start symbol (SS), a preamble (PR), a unique word (UW), a channel control (CI), a base station identification code (CS-ID), a mobile station identification code (PS-ID), information bits and error check bits (CRC). Transient response ramp amplifier (R), start symbol (SS), preamble (PR), unique word (UW), channel control (CI), base station identification code (CS-ID), mobile station identification code (PS-ID) and error check bits (CRC) are the same as those of the link channel establishment request message.

The message type included in the information bits represents that this message is the link allocation message. The slot number represents the number of the slot, to which the traffic channel is allocated. The first to fourth slots in the frame of master base station 1a bear the slot numbers of 1-4, respectively, and the first to fourth slots in the frame of slave base station 1b bear the slot numbers of 5-8, respectively.

When traffic channel allocation control unit 20a determines that allocation of the traffic channel allocation in its own station is impossible, and when traffic channel allocation control unit 20a receives the notification from allocation result notifying unit 32 to the effect that the traffic channel cannot be allocated in slave base station 1b, traffic channel allocation control unit 20a controls signal processing units 3a and 3b to transmit the link channel allocation rejection messages.

Figure 7:
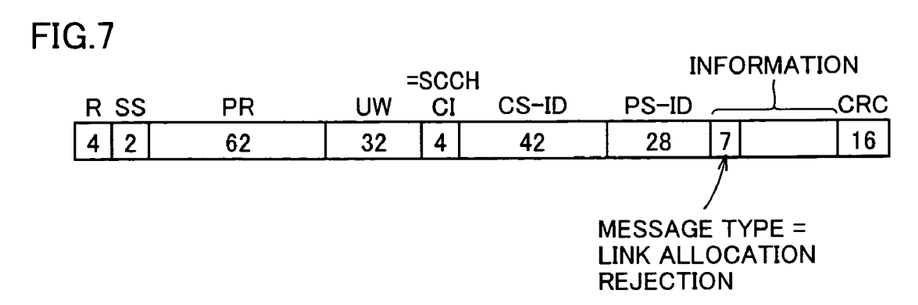
FIG. 7 illustrates a data format of a link channel allocation rejection message.

FIG. 7 illustrates a data format of the link channel allocation rejection message. Referring to FIG. 7, the link channel allocation rejection message is formed of a transient response ramp amplifier (R), a start symbol (SS), a preamble (PR), a unique word (UW), a channel control (CI), a base station identification code (CS-ID), a mobile station identification code (PS-ID), information bits and error check bits (CRC). Transient response ramp amplifier (R), start symbol (SS), preamble (PR), unique word (UW), channel control (CI), base station identification code (CS-ID), mobile station identification code (PS-ID) and error check bits (CRC) are the same as those of the link channel establishment request message.

The message type included in the information bits represents that this message is the link allocation rejection message.

When the traffic channel is allocated to the first slot, and the minimum value of the interference levels of the second to fourth reception slots is equal to or smaller than the predetermined threshold, traffic channel switch control unit 15b in slave base station 1b controls signal processing unit 3b to change the traffic channel to the slot (reception slot) of the minimum interference level and the transmission slot paired with it, and notifies reception control slot setting control unit 12b to the effect that the traffic channel is switched.

Figure 8:
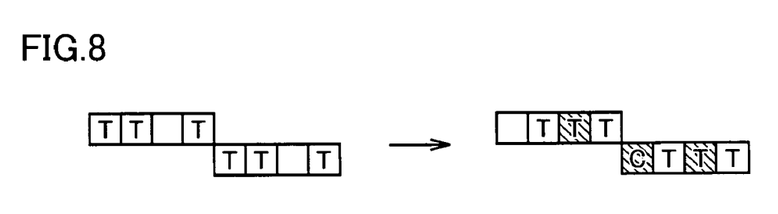
FIG. 8 illustrates an example of traffic channel switching in a frame of a slave base station.

FIG. 8 illustrates an example of the switching of the traffic channel in the frame of the slave base station. As illustrated in FIG. 8, the traffic channel is switched from the first slot in the frame of slave base station 1b to the third slot. The first slot for reception is reset as the reception control slot.

When the traffic channel is switched, traffic channel switch control unit 15b controls signal processing unit 3b to transmit the traffic channel switch instruction message.

Figure 9:
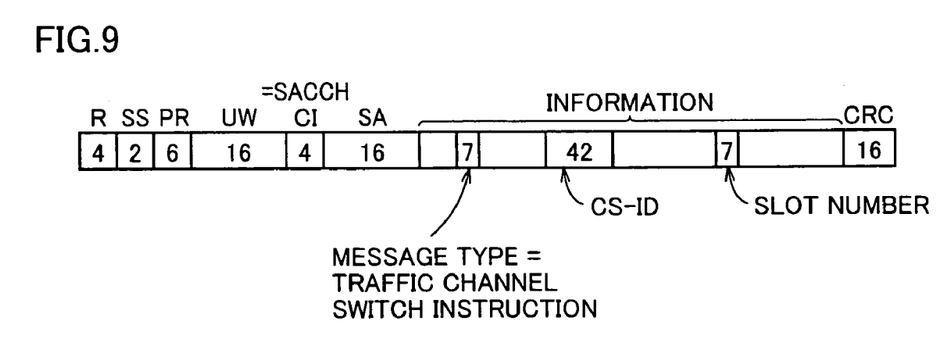
FIG. 9 illustrates a data format of a traffic channel switch instruction message.

FIG. 9 illustrates a data format of the traffic channel switch instruction message. Referring to FIG. 9, a transient response ramp amplifier (R), a start symbol (SS), a preamble (PR), a unique word (UW), a channel control (CI), SA, information bits and error check bits (CRC).

Transient response ramp amplifier (R), start symbol (SS), preamble (PR), unique word (UW), channel control (CI) and error check bits (CRC) are the same as those of the link channel establishment request message.

Channel control (CI) represents that this slot is used as slow associated control channel (SACCH). "SA" represents the slow associated control signal.

The message type included in the information bits represents that this message is the traffic channel switch instruction message. Base station identification code (CS-ID) included in the information bits is the code allocated to each base station. The slot number included in the information bits represents the number of the slot, to which the traffic channel is allocated.

Control device 30 includes a traffic channel allocation instructing unit 31, an allocation result notifying unit 32 and a frame synchronization notifying unit 33.

Traffic channel allocation instructing unit 31 obtains the reception level from the base station. When the reception level is received only from one base station, traffic channel allocation instructing unit 31 selects this one base station as the traffic base station. When the reception levels are received from the two base stations, traffic channel allocation instructing unit 31 selects the base station of the maximum reception level as the traffic base station. Traffic channel allocation instructing unit 31 transmits an instruction of the traffic channel allocation to the traffic channel allocation control unit of the selected base station.

When allocation result notifying unit 32 is notified by traffic channel allocation control unit 20b of the fact that the traffic channel is allocated as well as the slot number, and when allocation result notifying unit 32 is notified by traffic channel allocation control unit 20b of the fact that the traffic channel cannot be allocated, allocation result notifying unit 32 transfers the notified information to traffic channel allocation control unit 20a.

Frame synchronization notifying unit 33 notifies frame synchronization control unit 11b arranged in slave base station 1b of the timing of the frame received from frame synchronization control unit 11a in master base station 1a.

(Traffic Channel Allocating Operation)

Figure 10:
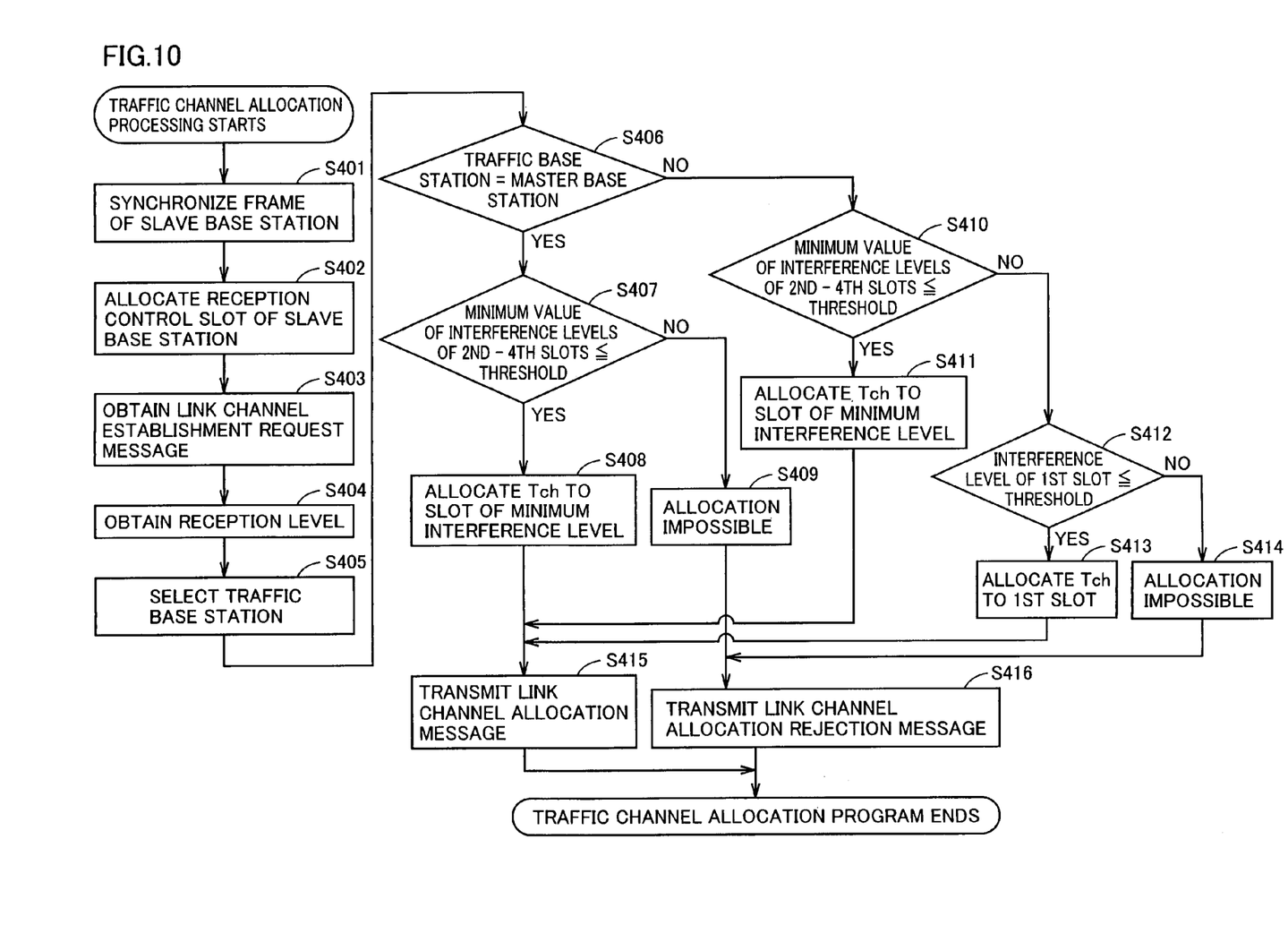
FIG. 10 is a flowchart illustrating operation procedures of traffic channel allocation processing.

FIG. 10 is a flowchart illustrating operation procedures of the traffic channel allocation processing, which is executed substantially by software of radio base station system according to the embodiment of the invention. The radio base station system reads a program including steps in the flowchart from a memory (not shown), and executes it. This program can be externally installed.

First, frame synchronization control unit 11a in master base station 1a notifies frame synchronization notifying unit 33 in control device 30 of timing of the frame of master base station 11a. Frame synchronization notifying unit 33 in control device 30 notifies frame synchronization control unit 11b in slave base station 1b of timing of the frame received from frame synchronization control unit 11 in master base station 1a. Frame synchronization control unit 11b in slave base station 1b controls signal processing unit 3b to match the timing of the frame in its own station with the timing of the frame of master base station 1a (step S401).

Reception control slot allocation control unit 12b in slave base station 1b controls signal processing unit 3b to allocate the first reception slot in the frame to the reception control slot (step S402).

Each of reception level obtaining units 13a and 13b of master and slave base stations 1a and 1b obtains demodulated data, which is provided from demodulator 6, of the signal received in the first reception slot, and determines whether it is the link channel establishment request message or not (step S403).

When each of reception level obtaining units 13a and 13b obtains the link channel establishment request message, it causes RSSI detecting unit 10a or 10b to detect the reception level of the reception signal in the reception slot in the next cycle, and transmits the obtained reception level to traffic channel allocation instructing unit 31 in control device 30 (step S404).

When traffic channel allocation instructing unit 31 in control device 30 receives the reception level only from one base station, traffic channel allocation instructing unit 31 selects this base station as the traffic base station. When traffic channel allocation instructing unit 31 receives the reception levels from the two base stations, it selects the base station of the maximum reception level as the traffic base station. Traffic channel allocation instructing unit 31 transmits the instruction of the traffic channel allocation to the traffic channel allocation control unit of the selected base station (step S405).

When traffic channel allocation control unit 20a in master base station 1a receives an instruction for the traffic channel allocation from traffic channel allocation instructing unit 31 in control device 30 (step S406), traffic channel allocation control unit 20a measures the interference levels of the second to fourth reception slots in the frame. When the minimum value of the measured interference levels of the second to fourth reception slots is equal to or smaller than a predetermined threshold (step S407), it controls signal processing unit 3a to allocate the traffic channel to the slot (reception slot) of the minimum interference level and the transmission slot paired with it (step S408).

When the minimum value of the measured interference levels of the second to fourth reception slots is larger than the predetermined threshold (step S407), traffic channel allocation control unit 20a determines that the allocation is impossible (step S409).

When traffic channel allocation control unit 20b in slave base station 1b receives an instruction for traffic channel allocation from traffic channel allocation instructing unit 31 in control device 30 (step S406), it measures the interference levels of the second to fourth reception slots in the frame. When the minimum value of the measured interference levels of the second to fourth reception slots is equal to or smaller than a predetermined threshold (step S410), traffic channel allocation control unit 20b controls signal processing unit 3b to allocate the traffic channel to the slot (reception slot) of the minimum interference level and the transmissions slot paired with it. When traffic channel allocation control unit 20b allocates the traffic channel, it notifies allocation result notifying unit 32 in control device 30 of the fact that the traffic channel is allocated as well as the allocated slot number (2, 3 or 4). Allocation result notifying unit 32 in control device 30 provides the information of the received notification to traffic channel allocation control unit 20a in master base station 1a (step S411).

When the minimum value of the measured interference levels of the second to fourth reception slots is larger than the predetermined threshold (step S410), traffic channel allocation control unit 20b measures the interference level of the first reception slot. When the interference level of the measured first reception slot is equal to or smaller than the predetermined threshold (step S412), traffic channel allocation control unit 20b controls signal processing unit 3b to allocate the traffic channel to the first slots (reception slot and transmission slot). When the traffic channel is allocated, traffic channel allocation control unit 20b notifies allocation result notifying unit 32 in control device 30 of the fact that the traffic channel is allocated as well as the allocated slot number (=1). Allocation result notifying unit 32 provides information of the received notification to traffic channel allocation control unit 20a in master base station 1a (step S413).

When the measured interference level of the first reception slot is larger than the predetermined threshold (step S412), traffic channel allocation control unit 20b determines that the allocation is impossible. When it is determined that the allocation is impossible, traffic channel allocation control unit 20b notifies allocation result notifying unit 32 in control device 30 of the result of determination that allocation of the traffic channel is impossible. Allocation result notifying unit 32 provides information of the received notification to traffic channel allocation control unit 20a in master base station 1a (step S414).

When traffic channel allocation control unit 20a allocates the traffic channel in its own station, and when it receives from allocation result notifying unit 32 in control device 30 the notification that the traffic channel is allocated in its own station as well as the notification of the allocated slot number, traffic channel allocation control unit 20a controls signal processing unit 3a to transmit the link channel allocation message (step S415).

When traffic channel allocation control unit 20a determines that the allocation of the traffic channel in its own station is impossible, and when traffic channel allocation control unit 20a is notified by allocation result notifying unit 32 in control device 30 of the result of determination that the allocation of the traffic channel is impossible in slave base station 1b, traffic channel allocation control unit 20a controls signal processing unit 3a to transmit a link channel allocation rejection message (step S416).

(Traffic Channel Switching Operation)

Figure 11:
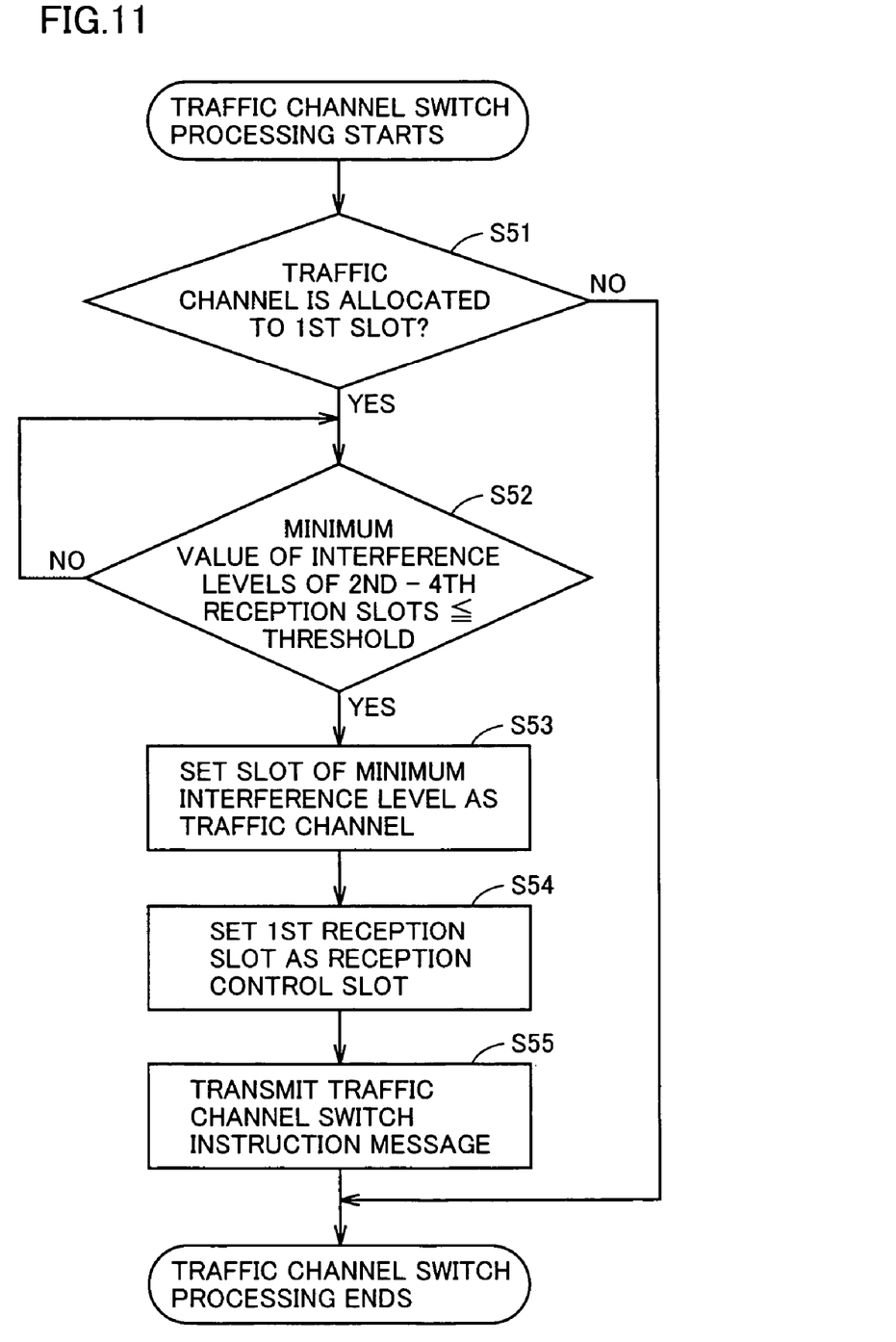
FIG. 11 is a flowchart illustrating operation procedures of traffic channel switching processing.

FIG. 11 is a flowchart illustrating operation procedures of the traffic channel switching procedures, which are executed substantially by software of the radio base station system according to the embodiment of the invention. The radio base station system reads a program including steps in the flowchart from a memory (not shown), and executes the read program. This program can be externally installed.

When the traffic channel is allocated to the first slot (step S51), and the minimum value of the interference levels of the second to fourth reception slots is equal to or smaller than the predetermined threshold (step S52), traffic channel switch control unit 15b in slave base station 1b controls signal processing unit 3b to switch the traffic channel to the slot (reception slot) of the minimum interference level and the transmission slot paired with it, and notifies reception control slot setting control unit 12b to the effect that the traffic channel is switched (step S53).

Reception control slot allocation control unit 12b in slave base station 1b controls signal processing unit 3b to allocate the first reception slot in the frame to the reception control slot (step S54).

When the traffic channel is switched, traffic channel switch control unit 15b controls signal processing unit 3b to transmit the traffic channel switch instruction message (step S55).

According to the radio base station system of the embodiment of the invention, since both master base station 1a and slave base station 1b obtain the link channel establishment requests, and the traffic channel is allocated to the frame of the base station, which achieves the reception level of the maximum value when the link channel establishment request is obtained. Therefore, the base station receiving the link channel establishment request is the same as the base station, to which the traffic channel is allocated, and the calling from the mobile station can succeed more reliably.

<Modifications>

The invention is not restricted to the above embodiment, and includes the following modifications and others.

(1) Reception Control Slot

In the embodiment of the invention, the first slots of the reception slots in the frames of master and slave base stations 1a and 1b are set as the reception control slots. However, this is not restrictive, and any pair of the second to fourth slots can be selected provided that the same timing is achieved.

(2) Allocation of Traffic Channel to First Slot

In the embodiment of the invention, when the traffic channel cannot be allocated to the second to fourth slots in the frame of slave base station 1b, it is allowed to allocate the traffic channel to the first slot. However, it may be absolutely prohibited to allocate the traffic channel to the first slot.

Although the present invention has been described and illustrated in detail, it is clearly understood that the same is by way of illustration and example only and is not to be taken by way of limitation, the spirit and scope of the present invention being limited only by the terms of the appended claims.

According to the invention, as described above, the slave base station synchronizes the frame of the master base station with its own frame, and sets the predetermined reception slot in its own frame of the same timing as the reception control slot in the frame of the master base station to the reception control slot. Also, when each of the base stations receives the link channel establishment request message in the reception control slot thus set, the base station obtains the reception level of the set reception control slot, and allocates the traffic channel with respect to the mobile station, which transmitted the link channel establishment request message, to the predetermined transmission and reception slots in the frame according to the traffic channel allocation instruction, and the control device receives the reception level from each base station, determines the base station of the maximum reception level, and transmits the traffic channel allocation instruction to the base station thus determined.

According to the radio base station system, channel allocation method and channel allocation program of the invention, therefore, the call from the mobile station can succeed more reliably.

INDUSTRIAL APPLICABILITY

Since the call can succeed more reliably in the radio base station formed of the master base station and the plurality of slave base stations, the invention is particularly effective in the radio base station system such as PHS.

The invention claimed is:

1. A radio base station system formed of one master base station, a plurality of slave base stations, and a control device controlling the master base station and the slave base stations, wherein the slave base station includes:
frame synchronizing means for synchronizing a frame of said slave base station with a frame of the master base station, and slot setting means for setting, as a reception control slot, a predetermined reception slot in the frame of said slave base station matching in timing with a reception control slot in the frame of the master base station;

each of the base stations includes:

reception level obtaining means for obtaining a reception level corresponding to a received signal strength of said set reception control slot when a link channel establishment request message is received in said set reception control slot, and traffic channel allocating means for allocating a traffic channel with respect to a mobile station transmitting the link channel establishment request message to predetermined transmission and reception slots in the frame according to a traffic channel allocation instruction; and the control device includes:

allocation instructing means for receiving the reception level from each of the base stations, determining the base station of the maximum reception level and transmitting the traffic channel allocation instruction to the determined base station.

2. The radio base station system according to claim 1, wherein said traffic channel allocation means of the slave base station allocates the traffic channel to the reception slot satisfying predetermined conditions when said reception slot satisfying said predetermined conditions exists other than said predetermined reception slot, and allocates the traffic channel to said predetermined reception slot when the reception slot satisfying the predetermined conditions does not exist.

3. The radio base station system according to claim 2, wherein said slave base station further includes:

traffic channel switching means for switching the slot for allocation of the traffic channel to the reception slot satisfying said predetermined conditions when the reception slot satisfying said predetermined conditions occurs among the reception slots other than said predetermined reception slot after the traffic channel is allocated to said predetermined reception channel.

4. The radio base station system according to claim 2, where said predetermined conditions include a measured minimum reception slot interference level.

5. A channel allocation method in a radio base station system formed of one master base station, a plurality of slave base stations and a control device controlling the master base station and the slave base stations, comprising the steps of:

causing the slave base station to synchronize a frame of said slave base station with a frame of the master base station;

causing the slave base station to set a predetermined reception slot in the frame of said slave base station matching in timing with the reception control slot in the frame of the master base station as the reception control slot;

causing each of the base stations to obtain a reception level corresponding to a received signal strength of the set reception control slot when the base station receives a link channel establishment request message in said set reception control slot; request message in said set reception control slot;

causing the control device to receive the reception level from each of the base stations, determine the base station of the maximum reception level and transmit a traffic channel allocation instruction to the determined base station; and causing the base station receiving the traffic channel allocation instruction to allocate a traffic channel with respect to a mobile station transmitting the link channel establishment request message to the predetermined transmission and reception slots in the frame.

6. The channel allocation method according to claim 5, wherein said step of allocating the traffic channel of the slave base station is executed to allocate the traffic channel to the reception slot satisfying predetermined conditions when the reception slot satisfying the predetermined conditions exists other than said predetermined reception slot, and to allocate the traffic channel to said predetermined reception slot when the reception slot satisfying the predetermined conditions does not exist.

7. The channel allocation method according to claim 6, further comprising the step of:

switching the slot for allocation of said traffic channel to the reception slot satisfying said predetermined conditions when the reception slot satisfying said predetermined conditions occurs among the reception slots other than said predetermined reception slot after the traffic channel is allocated to said predetermined reception channel.

8. The channel allocation method according to claim 6, wherein said predetermined conditions include a measured minimum reception slot interference level.

* * * * *